(12) United States Patent
Büttiker

(10) Patent No.: US 8,733,232 B2
(45) Date of Patent: May 27, 2014

(54) DRIVE FOR A COFFEE BREWING DEVICE AND COFFEE BREWING DEVICE

(75) Inventor: Philipp Büttiker, Oberbuchsiten (CH)

(73) Assignee: Jura Elektroapparate AG, Niederbuchsiten (CH)

( * ) Notice: Subject to any disclaimer, the term of this patent is extended or adjusted under 35 U.S.C. 154(b) by 1092 days.

(21) Appl. No.: 12/633,165

(22) Filed: Dec. 8, 2009

(65) Prior Publication Data

US 2010/0147091 A1    Jun. 17, 2010

(30) Foreign Application Priority Data

Dec. 12, 2008  (EP) ..................... 08405303

(51) Int. Cl.
*A47J 31/40*    (2006.01)

(52) U.S. Cl.
USPC .................... 99/302 P; 99/289 R

(58) Field of Classification Search
USPC ............... 99/302 P, 289 R, 287, 286, 280; 74/89.32
See application file for complete search history.

(56) References Cited

U.S. PATENT DOCUMENTS

| | | | |
|---|---|---|---|
| 5,259,296 A * | 11/1993 | Mikael et al. | 99/280 |
| 6,453,800 B1 | 9/2002 | Chen | |
| 2006/0117960 A1 * | 6/2006 | Fischer | 99/279 |

FOREIGN PATENT DOCUMENTS

| | | |
|---|---|---|
| DE | 20 2004 018 776 U1 | 3/2005 |
| EP | 0 528 757 A1 | 2/1993 |
| EP | 0 559 620 A1 | 9/1993 |
| EP | 1 483 992 A1 | 12/2004 |
| EP | 1 774 883 A1 | 4/2007 |

OTHER PUBLICATIONS

European Search Report issued in connection with European Application No. 08 40 5303 and completed on Apr. 23, 2009.

* cited by examiner

*Primary Examiner* — Dana Ross
*Assistant Examiner* — John Wasaff
(74) *Attorney, Agent, or Firm* — Alston & Bird LLP

(57) ABSTRACT

The invention relates to a drive for a coffee brewing device that includes a first gearwheel having an internal thread that is pivot-mounted to an external thread of a guide cylinder so that the first gearwheel can be moved along a cylinder axis of the guide cylinder in response to a rotation, a second gearwheel for driving the first gearwheel along the cylinder axis, a housing, and a brewing piston coupled to the housing so that the brewing piston and the first gearwheel can be moved along the cylinder axis. A linear guide running parallel to the cylinder axis is also provided for guiding the housing such that a movement of the housing opposite to the linear guide in a radial direction to the cylinder axis is prevented. An axis of rotation of the second gearwheel is arranged in a provided distance relative to the linear guide.

20 Claims, 4 Drawing Sheets

DRIVE FOR A COFFEE BREWING DEVICE AND COFFEE BREWING DEVICE

CROSS-REFERENCE TO RELATED APPLICATIONS

This application claims priority to and the benefit of the filing date of European Application No. 08405303.2, filed on Dec. 12, 2008, the contents of which are incorporated by reference herein.

FIELD OF THE INVENTION

The invention relates to a drive for a coffee brewing device and to a coffee brewing device comprising such a drive.

BACKGROUND OF THE INVENTION

A brewing device for coffee comprising a brewing piston, a brewing cylinder and an expulsion piston is known from patent specification EP 0 559 620 B1. The brewing device is used in so-called bean to cup coffee makers. In the brewing device, ground coffee powder is brewed with hot water, which is guided into the brewing chamber by means of supply elements. The coffee brewed in the brewing cylinder is guided to a coffee container by means of outflow elements. After the brewing process, the residual water is extruded from the coffee powder and the pulp remaining in the brewing cylinder is ejected through the ejection piston. Due to its constructions, the brewing device encompasses a relatively large volume (and measured by present demands relating to bean to cup coffee makers) a volume, which is too large. In addition, the brewing unit develops a relatively high noise emission during operation, which is in particular ascribed to the operation of a drive device, which serves the purpose of moving different movable parts, in particular the brewing piston. The drive device comprises several gearwheels, which are cogged with one another, one of which can be driven by means of a drive motor and another one of which is coupled to the brewing piston in such a manner that the brewing piston can be moved back and forth along an axis by means of the drive motor.

BRIEF SUMMARY OF THE INVENTION

It is the object of the instant invention to avoid the described disadvantages and to provide a lower-noise drive for a coffee brewing device, which is designed in a simple and compact manner in terms of its construction, and which can be produced in a cost-efficient manner.

This object is solved by means of a drive according to the characterizing part of claim 1.

The drive comprises: a first gearwheel comprising an internal thread, via which said first gearwheel is pivot-mounted on an external thread of a guide cylinder, so that the first gearwheel can be moved along a cylinder axis of the guide cylinder in response to a rotation; a second gearwheel, which for the purpose of driving the first gearwheel along the cylinder axis, engages with said first gearwheel; a housing, in which the first gearwheel is accommodated; and a brewing piston, which is coupled to the housing, so that said brewing piston can be moved together with the first gearwheel along the cylinder axis.

According to the invention, the drive comprises a linear guide for the housing, which linear guide runs at a distance parallel to the cylinder axis and by means of which the housing is engaged in such a manner that a movement of the housing opposite to the linear guide in a radial direction to the cylinder axis is prevented. An axis of rotation of the second gearwheel is furthermore arranged at a provided distance relative to the linear guide.

Within the scope of this description, the term "housing, in which the first gearwheel is accommodated" is to be understood in a very general way as a component, which performs the function of a coupling between the first gearwheel and the brewing piston and which at least partially encloses the first gearwheel for this purpose. The "housing" can thereby also be embodied as a type of cage, which encloses the first gearwheel. The cage can encompass several, partly large borings.

Due to the fact that the housing, which surrounds the first gearwheel, is guided by means of the linear guide in a linear manner in response to a movement along the cylinder axis of the guide cylinder, it is prevented that the housing can move beyond certain (provided) tolerances opposite to the linear guide in a radial direction to the cylinder axis. Due to the fact that the axis of rotation of the second gearwheel is additionally arranged at a provided distance relative to the linear guide, it is attained that the spatial position of the second gearwheel relative to the cylinder axis (within provided tolerances) is maintained so as to be constant and is thus stabilized in the event that the second gearwheel is rotated by driving the second gearwheel (e.g. by means of a motor) and in the event that, due to this rotation, the first gear wheel is driven and is thus also rotated and—due to the cogging between the internal thread of the first gearwheel and the external thread of the guide cylinder—is thereby moved in longitudinal direction of the cylinder axis. Radial vibrations of the second gearwheel relative to the cylinder axis and thus also radial vibrations of the second gearwheel relative to the first gearwheel are thus suppressed during the operation of the drive or are at least limited, respectively. This improves the quiet running of the drive and reduces noise emissions during operation.

According to an embodiment of the drive, a pivot bearing is embodied between the housing and the first gearwheel, said pivot bearing preventing a radial movement of the housing (within provided tolerances) opposite to the first gearwheel. The first gearwheel is guided on the housing by means of the pivot bearing, whereby a radial and axial beating or vibrating of the first gearwheel and a noise development connected therewith is thus prevented. In so doing, radial vibrations of the second gearwheel relative to the first gearwheel are additionally reduced and the quiet running of the two gearwheels relative to one another is improved.

According to an advantageous embodiment, the housing and the first gearwheel are formed and adapted in such a manner, that they form the pivot bearing.

A particularly simple design of the pivot bearing in terms of its construction provides for the pivot bearing to be formed by means of a rotating stop on the housing, against which a cylindrical appendage of the first gearwheel abuts. Needless to say, however, it is also possible to choose other types of bearings, when this is acceptable within the scope of the required dimensioning of the drive, e.g., a ball bearing, an antifriction bearing or a connector, which encompasses a low coefficient of friction, at least at one of the friction surfaces.

A particularly low-noise operation of the housing and of the first gearwheel is attained in that they encompass mutual contact surfaces, which are provided with lower friction surfaces as compared to the basic material thereof. On principle, however, it is also possible to produce both parts from a material, which already encompasses a low coefficient of friction. Vibrations and thus friction noises are reduced by means of this coefficient of friction.

An additional noise reduction can be attained in that the housing completely encloses the first gearwheel, with the exception of an opening, which is required for the engagement of the second gearwheel. Noises are retained in the housing by means of the complete enclosure. In addition, the housing can absorb the sound by means of using noise-absorbing materials or by means of suitable designs. The hollow body-like basic shape, which results from the enclosure of the gearwheel, which is as complete as possible, furthermore lends stability to the housing, whereby a beating or vibrating is prevented.

In a further advantageous embodiment, the housing is coupled to the brewing piston via a metal plate, which extends in a plane, which runs in radial direction to the cylinder axis. The metal plate can furthermore permeate at least a portion of the housing and/or of the brewing piston. This coupling via a metal plate has different advantages as compared to a conventional connection (for example known from EP 0 559 620 B1) between brewing piston and housing by means of a plastic part. Due to the fact that plastics typically encompass a lower stiffness as compared to metals such as steel or aluminum, a plastic part, which is suitable as a connection between brewing piston and housing, and which thus encompasses a low weight and a high stiffness on the one hand, could preferably be embodied as a hollow body, for example as a pipe comprising a rectangular hollow profile. Such a hollow body made of plastic has a relatively large cross sectional profile and leads to a relatively large installation height of the drive. Typically, the walls of such a hollow body furthermore lead to audible vibrations. Due to the higher stiffness of the metal, it is possible to embody the connection between brewing piston and housing not as a hollow body, but as a massive metal plate. In so doing, (as compared to a coupling by means of a plastic part), a low-vibration coupling of the piston to the housing is attained. At the same time, the metal plate encompasses a smaller installation height in the direction of the cylinder axis, whereby a reduction of the brewing unit can be attained. A simultaneous high stability and noise reduction of the connection is attained in that the metal plate permeates the housing and/or the brewing piston.

In a particularly advantageous embodiment, the drive encompasses a base, to which lower end of the linear guide and a lower end of the guide cylinder are rigidly connected. A rigid connection prevents a vibration movement of these components relative to one another and thus the noise development between them. In addition, a highly accurate parallel guiding of the housing opposite to the cylinder axis is ensured thereby.

In a particularly advantageous embodiment, a lower end of an axis of rotation of the second gearwheel is fastened to the base and an upper end of this axis of rotation is fastened to an extension of the linear guide. The fastening of the axis of rotation of the second gearwheel between base and extension of the linear guide ensures that the axis of rotation of the second gearwheel is held in a provided distance relative to the linear guide on at least two points. This arrangement provides a high stability to the second gearwheel opposite to the cylinder axis and opposite to the first gearwheel. Tipping and deflection, in particular, of the axis of rotation of the second gearwheel and vibrations of the second gearwheel relative to the linear guide or the housing, respectively, or the first gearwheel, respectively, which are connected therewith, can thus be reduced or suppressed, respectively, in a particularly effective manner. An optimal and low-noise engagement of the two gearwheels is thus attained.

In a further advantageous embodiment, the linear guide runs on one side of the housing, which faces the second gearwheel. A canting of the housing opposite to the linear guide can thus be counteracted and the quiet running of the drive can be improved.

The danger of this canting of the housing opposite to the linear guide can also be reduced in that the linear guide comprises at least one straight guide rod, which is at least partly encompassed by the housing. In addition, the linear guide for the housing can be stabilized when the linear guide comprises more than one guide rod. Due to the fact that the housing is guided on two straight guide rods, for example, the housing is stabilized with reference to a further potential tipping axis, which additionally improves the function of the drive.

In a particularly preferred embodiment, the respective guide rods encompass an axially running groove, into which a projection embodied on the housing engages in each case. The groove and the projections embodied on the housing are thereby matched to one another with reference to the shape and size thereof in such a manner that a canting of the housing on the linear guide (beyond provided tolerances) is prevented. Relatively high forces can thus furthermore also be transferred between the housing and the linear guide.

In a particularly advantageous manner, the groove is thereby open in the direction of the second gearwheel. The assigned projections are thereby pressed into the groove as soon as a power transmission takes place from the second gearwheel to the first gearwheel, that is, as soon as the first gearwheel is driven. This has the effect that a quasi self-stabilizing coupling is created under application of a force between the housing, in which the first gearwheel is supported, and the linear guide.

In a further embodiment of the drive, a lower end of an axis of rotation of the second gearwheel is fastened to the base of the drive and an upper end of this axis of rotation is fastened to an extension, which is rigidly connected to at least one of the respective guide rods. In so doing, it is attained that the distance between the cylinder axis of the guide cylinder or of the axis of rotation, respectively, of the first gearwheel and the axis of rotation of the second gearwheel is maintained so as to be constant, independent of the position of the brewing piston or of the first gearwheel, respectively, along the cylinder axis. The axes of rotation of the first gearwheel and of the second gearwheel are thus stabilized relative to one another and vibrations of the two gearwheels in a radial direction to the respective axes of rotation are prevented. The smooth running of the drive is thus improved and results in a constant power transmission of the two gearwheels across the entire stroke movement.

Due to the fact that the distance of the axes of rotation of the first and of the second gearwheel is controlled with a high precision within provided tolerances, the gearwheel module (defined as the ratio between the diameter of the respective gearwheel and the number of the teeth of the gearwheel) can be chosen to be relatively small, which in turn has a noise-reducing effect.

In an additional advantageous embodiment, the linear guide encompasses a U-shaped or H-shaped cross sectional profile. Cross sectional profiles formed in such a manner are known for a flexural stiffness, which is increased as compared to round profiles, for example, and thus for a low vibration.

An embodiment, which is particularly preferred in terms of its construction, provides for the housing to encompass flanges, which are embodied thereon in one piece and via which said housing is engaged with the linear guide. An additional opening of the housing opposite to the environment is prevented by means of the embodiment of the flanges, with sound being capable of escaping through said opening from the interior of the housing into the environment.

The noise development can furthermore be reduced in that the drive provides for a transmission ratio between the first gearwheel and the second gearwheel in a range between 4 and 4.5. Such a transmission ratio provides for an improved power transmission between a motor and a brewing piston, wherein the drive can be operated at a lower speed, which causes a low noise development.

The afore-mentioned object is also solved by means of a coffee brewing device comprising a drive, wherein the drive comprises a first gearwheel defining an internal thread, via which said first gearwheel is pivot-mounted on an external thread of a guide cylinder, so that the first gearwheel is configured to move along a cylinder axis of the guide cylinder in response to a rotation; a second gearwheel configured to engage with said first gearwheel to drive the first gearwheel along the cylinder axis; a housing, in which the first gearwheel is accommodated; a brewing piston, which is coupled to the housing, so that said brewing piston is configured to move together with the first gearwheel along the cylinder axis; and a linear guide configured to guide the housing, which runs at a distance parallel to the cylinder axis and with which the housing is engaged such that the housing is configured to perform a linear movement along the linear guide and a movement of the housing opposite to the linear guide in a radial direction to the cylinder axis is prevented, wherein the second gearwheel defines an axis of rotation arranged in a provided distance relative to the linear guide.

The advantages, which have already been described in combination with the drive, are also attained by means of the coffee brewing device according to the invention.

Provision is thus made in a preferred embodiment for the drive to be fastened to a base support via a damping element. With the use of the damping element, the base support or further parts are prevented from being acoustically induced to vibrate or even from acting as resonance bodies.

Preferably, the damping element thereby consists of a rubber material. With the use of a rubber element, a damping, which is cost-efficient and which is tuned to the frequency range of the noise, can be attained.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
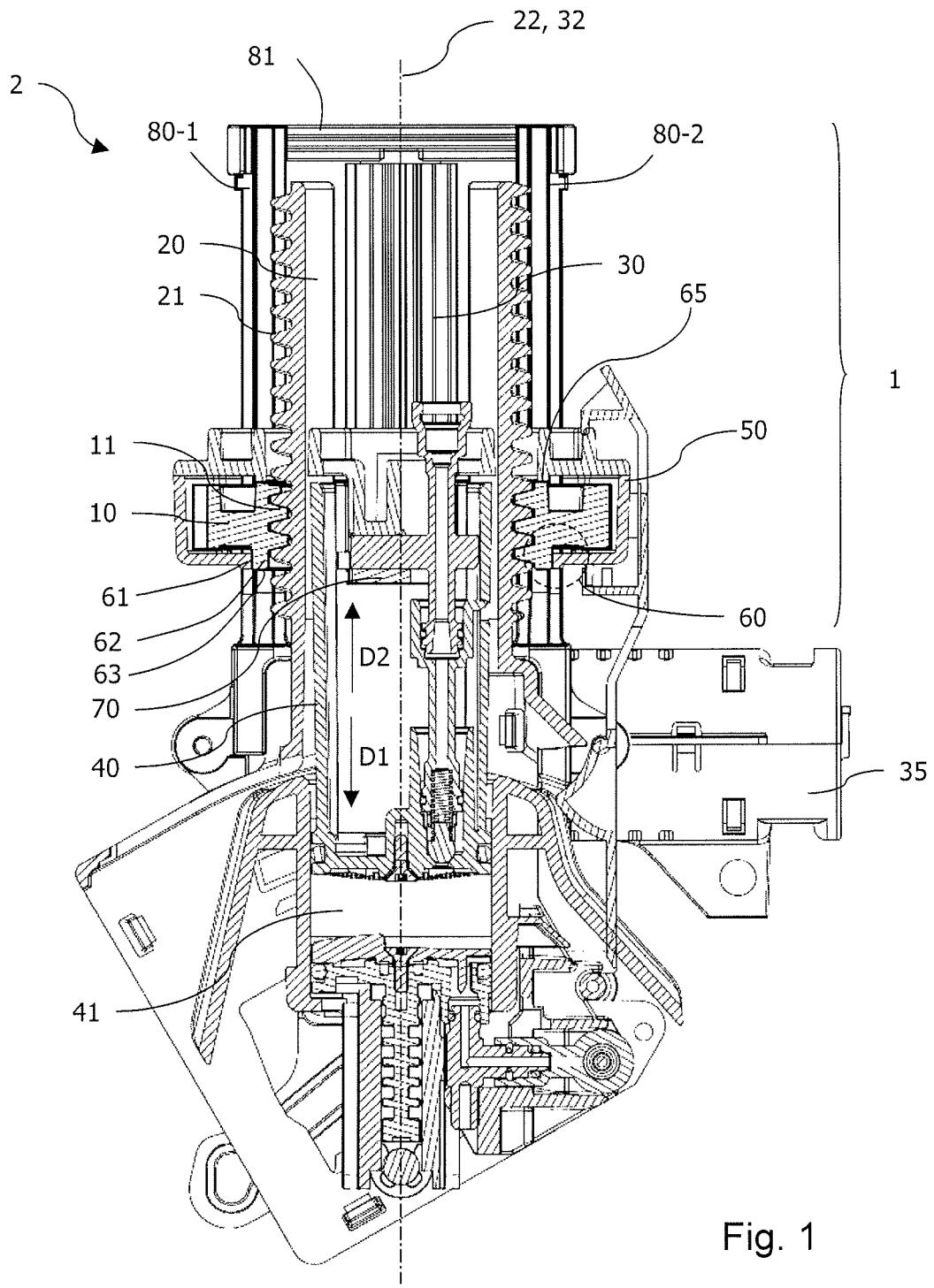
FIG. 1 shows a longitudinal section through a coffee brewing device comprising a drive according to the invention in a side view.

FIG. 1 shows a longitudinal section through a coffee brewing device 2 comprising a drive 1 according to the invention in a side view. The drive 1 thereby initially encompasses a first gearwheel 10 comprising an internal thread 11. This internal thread 11 is pivot-mounted on an external thread 21 of a guide cylinder 20, so that it can be moved along a cylinder axis 22, as soon as it is rotated. In the instant case, the cylinder axis 22 forms the axis of rotation of the first gearwheel 10. The first gearwheel is thereby engaged with a second gearwheel 30, which drives the first gearwheel 10 and the axis of rotation 32 of which is located downstream from the cylinder axis 22 in viewing direction. For this purpose, the second gearwheel 30 is again driven by a motor 35 comprising a bevel gearwheel 35-1. The first gearwheel 10 is coupled to a brewing piston 40, which can be moved up and down along the cylinder axis 22 by means of the first gearwheel 10. In the instant figure, the brewing piston 40 is located in a brewing position, that is, the piston 40 exerts pressure onto the coffee located in a brewing chamber 41. The brewing piston 40 is thereby coupled via a housing 50 to the first gearwheel 10, which encloses the gearwheel 10.

To prevent radial vibrations of this housing 50 opposite to the first gearwheel 10, provision is made between the first gearwheel 10 and the housing 50 for a pivot bearing 60, which consists of a rotating stop 61, which is embodied on the housing 50 and against which a cylindrical appendage 62 of the first gearwheel 10 abuts. In so doing, the first gearwheel 10 as well as the housing 50 is guided along the cylinder axis 22 in a radial manner relative to the cylinder axis. In so doing, vibrations of the first gearwheel 10 and of the housing 50 in radial direction to the cylinder axis 22 are effectively dampened, which leads to a considerable noise reduction of the drive.

A connection of the piston 40 to the housing 50 provides for a metal plate 70, which replaces a currently common plastic fastener, which is susceptible to vibrations to a considerably higher degree (for example in the form of a hollow body comprising a rectangular cross sectional profile, as is known from EP 0 559 620 B1), which furthermore requires a greater cross section.

In the event that the first gearwheel 10 is rotated about the axis of rotation 32 in such a manner that it moves on the external thread 21 along the cylinder axis 22 in the direction towards the brewing chamber 41 (that is, in the direction of the arrow D1 in FIG. 1), a surface area 63 of the cylindrical appendage 62 is in contact with the metal plate 70 and presses against the metal plate 70. In so doing, the first gearwheel 10 is coupled to the housing 50 in response to a movement in the direction of the arrow D1. In the event that the first gearwheel 10 is rotated about the axis of rotation 32 in such a manner that it moves on the external thread 21 along the cylinder axis 22 away from the brewing chamber 41 (that is, opposite to the direction of the arrow D1 or in the direction of the arrow D2 in FIG. 1, respectively), a surface area 65 of the first gearwheel 10 facing away from the brewing chamber 41 is in contact with the housing 50 and pushes against the housing 50. In so doing, the first gearwheel 10 is coupled to the housing 50 in response to a movement in the direction of the arrow D2.

Figure 2:
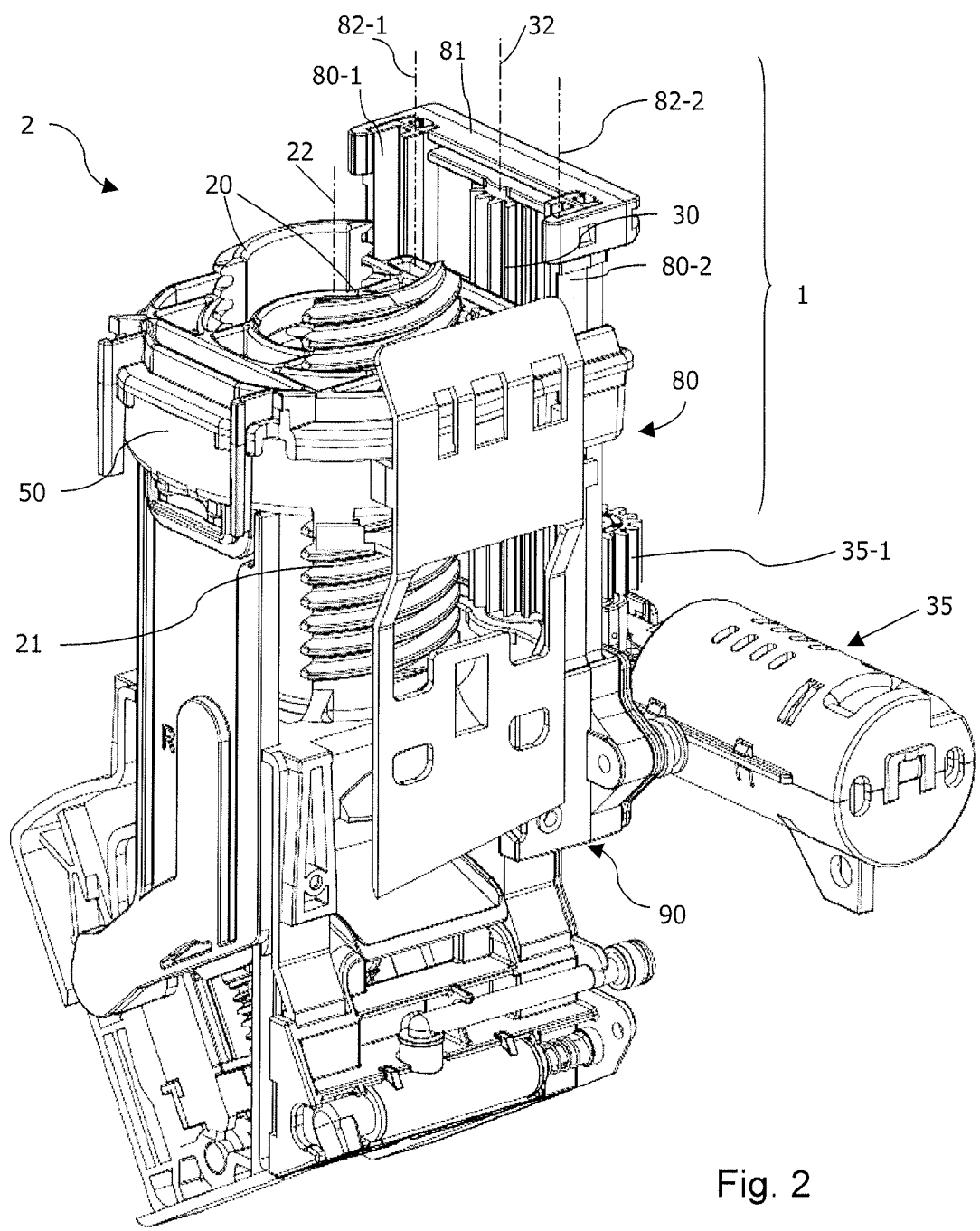
FIG. 2 shows a perspective illustration of the coffee brewing device of FIG. 1 in a view from the front at an angle.
Figure 3:
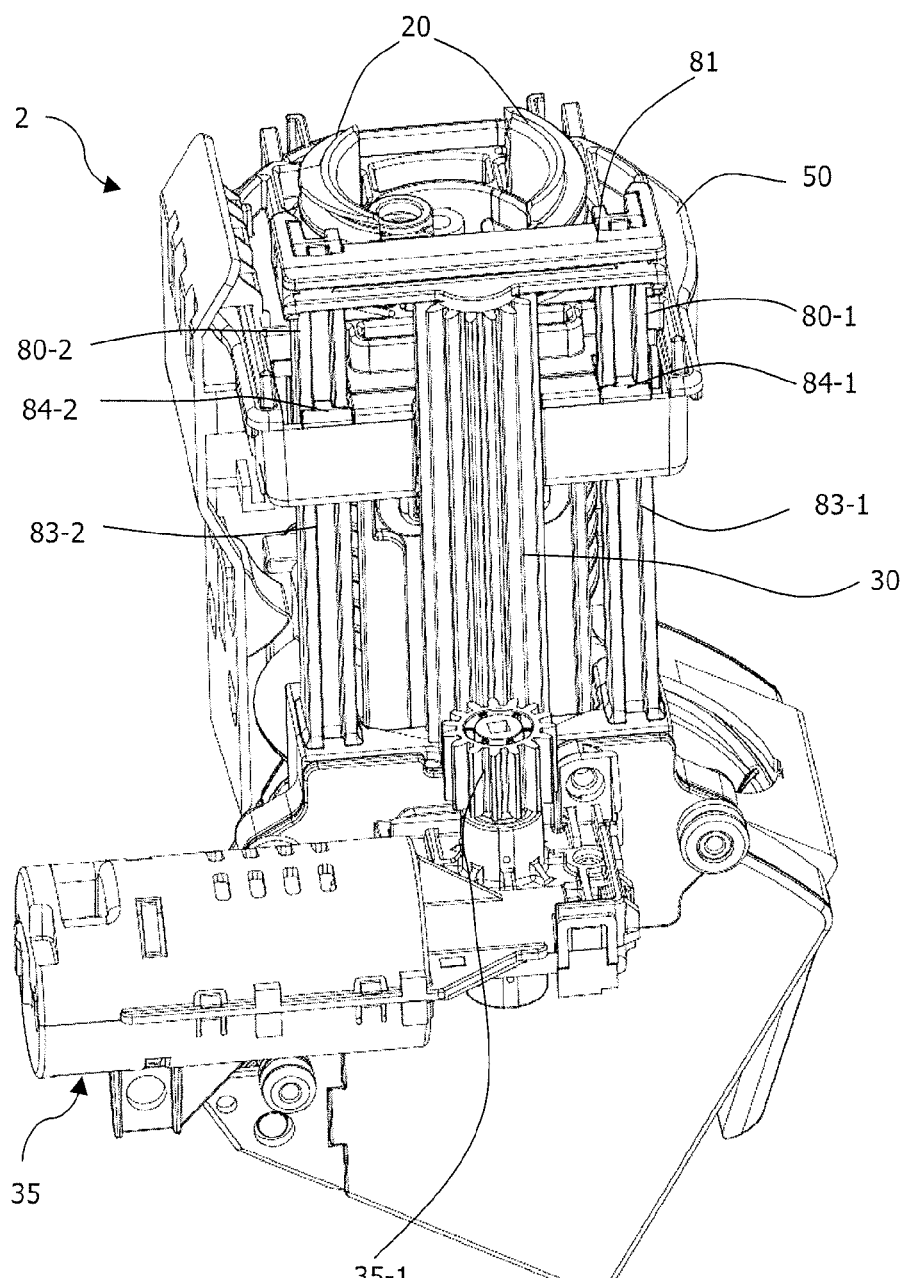
FIG. 3 shows a perspective illustration of the coffee brewing device as in FIG. 2, but from another perspective.

FIGS. 2 and 3 show the coffee brewing device 2 according to FIG. 1 from different perspectives. As is shown in FIGS. 2 and 3, the drive 1 comprises a linear guide 80, on which the housing 50 is guided in response to its stroke movement along the guide cylinder 20. For this purpose, the housing is engaged with the linear guide 80 in a manner, which will be defined below in more detail. The linear guide 80 itself comprises two guide rods 80-1 and 80-2, which ideally encompass a U-shaped or H-shaped cross sectional profile, so as to increase the flexural stiffness thereof and to thus reduce the natural vibration thereof. The rods 80-1 and 80-2 are fixedly supported on a base 90 of the device 2 opposite to the guide cylinder 20. With this embodiment of a guide for the housing 50, the vibration susceptibility thereof and thus its possible noise development is further reduced considerably.

This is furthermore supported in that the guide 80 is attached to the side of the housing 50, at which the power transmission from the second gearwheel 30 to the first gearwheel 10 takes place (not visible herein). A slight canting and subsequently a volatile movement of the housing 50 on the linear guide itself is ruled out.

For the particularly low-vibration support of the second gearwheel 30, it is thereby embodied in such a manner that the upper ends of the guide rods 80-1 and 80-2 are connected to one another via an extension 81. On the one hand, the axis of rotation 32 of the second gearwheel 30 is supported on this extension 81 and, on the other hand, on the base 90, whereby the guide 80 also serves the purpose of suspending this gearwheel 30 in a vibration-free manner, particularly because the axis of rotation 32 of the second gearwheel 30 is held on opposite ends on the base 90 as well as on the extension 81 in each case at a provided distance relative to the liner guide 80 or relative to the guide rods 80-1 and 80-2, respectively. In so doing, the axis of rotation 32 of the second gearwheel 30 is secured in a particularly effective manner against tipping or deflection, respectively, relative to the linear guide 80. At the same time, the guide 80 and the second gearwheel 30 form a particularly compact and space-saving common structural unit, which does not have a negative effect on the installation height of the coffee brewing device 2, that is, it does not increase the installation height of the coffee brewing device.

Figure 4:
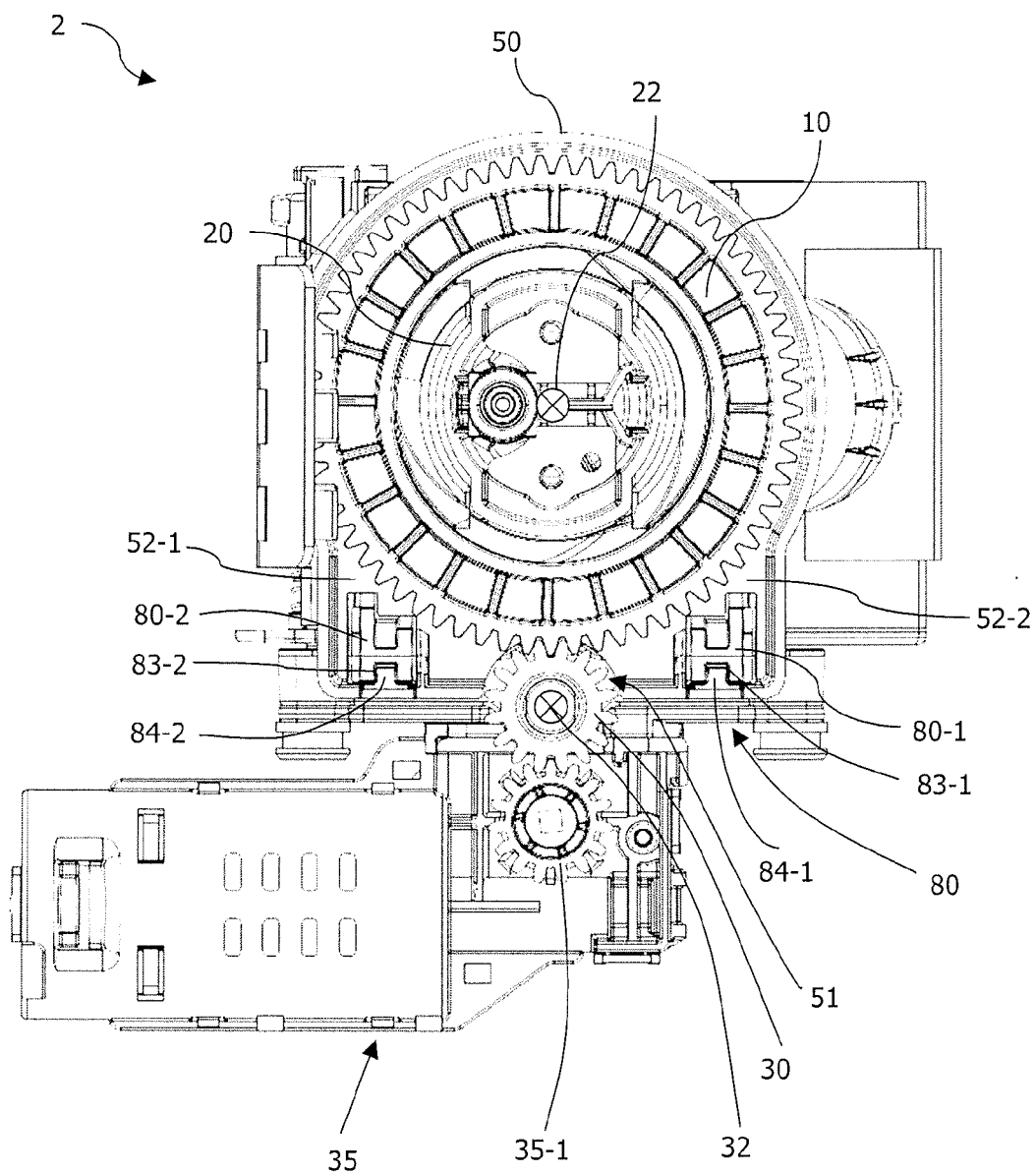
FIG. 4 shows a top view onto the coffee brewing device of FIG. 1 in response to an open housing.

Finally, FIG. 4 shows a top view onto the coffee brewing device 2 of FIG. 1 in response to an open housing 50. The first gearwheel 10, which is supported in the housing 50, can again be seen. The first gearwheel 10 is rotated by means of the second gearwheel 30, which, in turn, is driven by the motor 35. The first gearwheel 10, together with the housing 50 and the brewing piston 40 coupled thereto, can thus be moved in a direction at right angles to the sheet plane and thus along the guide cylinder 20.

Flanges 52-1, 52-2, through which a guide rod 80-1 or 80-2, respectively, of the linear guide 80 passes in each case, are embodied on this housing so as to be connected thereto in one piece for the purpose of guiding the housing 50 on the linear guide 80. The guide rods 80-1, 80-2 thereby encompass in each case an approximately H-shaped cross sectional profile comprising a groove 83-1 or 83-2, respectively, into which grooves 83-1 or 83-2, respectively, a projection 84-1 or 84-2, respectively, engages, which projection is embodied on the housing 50. The guide of the projections 84-1, 84-2 in the corresponding groove 83-1, 83-2 thereby prevents a vibration movement of the housing in radial direction to the cylinder axis 22, which causes a noise reduction. Due to the fact that the groove 83-1, 83-2 opens in the direction of the second gearwheel 30, the corresponding projection 84-1, 84-2 is pressed into this groove, as soon as the second gearwheel 30 rotates and exerts a force onto the first gearwheel 10 and thus onto the housing 50. This contributes to a stabilization of the engagement between housing 50 and linear guide 80, which precludes a formation of vibration.

In the instant case, the extension 81 is rigidly connected to each of the guide rods 80-1 and 80-2. Due to the fact that the housing 50 engages with the linear guide 80 or with the respective guide rod 80-1 or 80-2, respectively, in such a manner that a movement of the housing 50 opposite to the respective guide rod 80-1 or 80-2, respectively, in a radial direction to the cylinder axis 22 is in each case prevented and due to the fact that the axis of rotation 32 of the second gearwheel 30 is arranged in a provided distance relative to the linear guide 80 or to the respective guide rod 80-1 or 80-2, respectively, it is ensured in the instant case that the distance between the cylinder axis 22 or the axis of rotation of the first gearwheel 10, respectively, and the axis of rotation 32 of the second gearwheel 30 is held so as to be constant, independent on the position of the brewing piston 40 or of the first gearwheel 10, respectively, along the cylinder axis 22. The first gearwheel 10 is thus guided opposite to the second gearwheel 30 during a stroke movement along the cylinder axis 22 (within provided tolerances).

Due to the embodiment of the flanges 52-1, 52-2, the first gearwheel 10 can furthermore be completely enclosed by the housing 50, so that a remaining noise development does not permeate to the outside. An opening 51 in the housing 50 is chosen to be only as large as it is required for the operative connection between first and second gearwheel 10, 30, so as to attain a noise insulation as well herein.

A further noise reduction is attained in that a transmission ratio between the first gearwheel 10 and the second gearwheel 30 is chosen to be between 4.0 and 4.5, so that a more powerful drive is ensured, which easily overcomes frictional forces between the first gearwheel 10 and the housing 50, so that volatile rotary movements and thus vibrations, which can preferably be excited by means of volatile rotary movements, are prevented.

The coffee brewing device 2 can preferably be attached to a base support in a rubber-cushioned manner, so as to preclude a transmission of vibration to a housing. However, the drive 1, which is only shown in an exemplary manner herein, already allows for a considerable noise reduction, is furthermore designed in a simple and compact manner in terms of its construction and can thus be produced in a cost-efficient manner.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A drive for a brewing device, comprising:
    a first gearwheel defining an internal thread, via which said first gearwheel is pivot-mounted on an external thread of a guide cylinder, so that the first gearwheel is configured to move along a cylinder axis of the guide cylinder in response to a rotation;
    a second gearwheel configured to engage with said first gearwheel to drive the first gearwheel along the cylinder axis;
    a housing, in which the first gearwheel is accommodated;
    a brewing piston, which is coupled to the housing, so that said brewing piston is configured to move together with the first gearwheel along the cylinder axis; and
    a linear guide configured to guide the housing, which runs at a distance parallel to the cylinder axis and with which the housing is engaged such that the housing is configured to perform a linear movement along the linear guide and a movement of the housing opposite to the linear guide in a radial direction to the cylinder axis is prevented, wherein the second gearwheel defines an axis of rotation arranged in a provided distance relative to the linear guide.

2. The drive according to claim 1 further comprising a base, to which a lower end of the linear guide and a lower end of the guide cylinder is rigidly connected.

3. The drive according to claim 1, wherein the linear guide runs on one side of the housing, which faces the second gearwheel.

4. The drive according to claim 1, wherein the linear guide comprises at least one guide rod at least partially encompassed by the housing.

5. The drive according to claim 4, wherein the respective guide rod defines at least one axially running groove configured to engage a projection of the housing.

6. The drive according to claim 4, wherein a lower end of the axis of rotation of the second gearwheel is fastened to the base and an upper end of said axis of rotation is fastened to an extension, which is rigidly connected to at least one of the respective guide rods.

7. The drive according to claim 5, wherein the groove is open in the direction of the second gearwheel.

8. The drive according to claim 4, wherein the respective guide rod has a U-shaped or H-shaped cross sectional profile.

9. The drive according to claim 1, wherein the housing comprises flanges, which are embodied thereon in one piece, via which said housing engages with the linear guide.

10. The drive according to claim 1 further comprising a pivot bearing configured to prevent a radial movement of the housing opposite to the first gearwheel, the pivot bearing disposed between the housing and the first gearwheel.

11. The drive according to claim 10, wherein the pivot bearing is defined by the housing and the first gearwheel.

12. The drive according to claim 10, wherein the pivot bearing is defined by a rotating stop of the housing, against which stop a cylindrical appendage of the first gearwheel abuts.

13. The drive according to claim 1, wherein the housing completely encloses the first gearwheel, with the exception of an opening defined by the housing and configured to allow for the engagement of the second gearwheel with the first gearwheel.

14. The drive according to claim 1, wherein the brewing piston is coupled to the housing via a metal plate, which extends in a plane that runs in a radial direction to the cylinder axis.

15. The drive according to claim 14, wherein the metal plate permeates at least a part of at least one of the housing and the brewing piston.

16. The drive according to claim 1, wherein the first gearwheel and the second gearwheel have a transmission ratio in a range of between approximately 4 and 4.5.

17. A brewing device comprising a drive, wherein the drive comprises:
a first gearwheel defining an internal thread, via which said first gearwheel is pivot-mounted on an external thread of a guide cylinder, so that the first gearwheel is configured to move along a cylinder axis of the guide cylinder in response to a rotation;
a second gearwheel configured to engage with said first gearwheel to drive the first gearwheel along the cylinder axis;
a housing, in which the first gearwheel is accommodated;
a brewing piston, which is coupled to the housing, so that said brewing piston is configured to move together with the first gearwheel along the cylinder axis; and
a linear guide configured to guide the housing, which runs at a distance parallel to the cylinder axis and with which the housing is engaged such that the housing is configured to perform a linear movement along the linear guide and a movement of the housing opposite to the linear guide in a radial direction to the cylinder axis is prevented,
wherein the second gearwheel defines an axis of rotation arranged in a provided distance relative to the linear guide.

18. The brewing device according to claim 17, wherein the linear guide of the drive comprises at least one guide rod at least partially encompassed by the housing, and wherein the respective guide rod defines at least one axially running groove configured to engage a projection of the housing.

19. The brewing device according to claim 17, further comprising a damping element between the drive and a base support, wherein the drive is fastened to the base support via the damping element.

20. The brewing device according to claim 19, wherein the damping element consists of a rubber material.

* * * * *